United States Patent Office  3,714,196
Patented Jan. 30, 1973

3,714,196
AMINOACETALS AND AMINOKETALS, PROCESSES FOR THEIR MANUFACTURE AND THEIR USE
Helmut Zondler, Allschwil, Switzerland, and Wolfgang Pfleiderer, Konstanz, Germany, assignors to Ciba-Geigy AG, Basel, Switzerland
No Drawing. Filed Apr. 20, 1971, Ser. No. 135,774
Int. Cl. C07d 13/04
U.S. Cl. 260—340.9                                6 Claims

ABSTRACT OF THE DISCLOSURE

New acetals or ketals substituted in the α-position by at least two aminopropyl groups, for example 2,2-bis(γ-aminopropyl)propionaldehyde - glycol - acetal or 1,1,1-tris(γ-aminopropyl) acetone-ethylene glycol-acetal, are manufactured by catalytically hydrogenating acetals or ketals substituted by at least two β-cyanoethyl groups in the α-position.

The new compounds are valuable curing agents for epoxide resins.

---

The subject of the present invention are new acetals or ketals, substituted in the α-position by at least two γ-aminopropyl groups, of the general formula

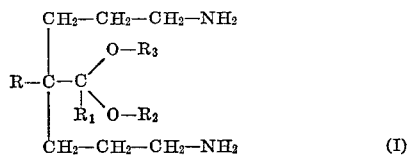

(I)

wherein R represents a hydrogen atom, or an aliphatic hydrocarbon radical preferably containing 1 to 7 carbon atoms, or a cycloaliphatic, araliphatic or aromatic hydrocarbon radical, or a γ-aminopropyl radical

—CH$_2$—CH$_2$—CH$_2$—NH$_2$ and R$_1$ denotes a hydrogen atom or an aliphatic hydrocarbon radical preferably containing 1 to 7 carbon atoms or a cycloaliphatic, araliphatic or aromatic hydrocarbon radical, or wherein R and R$_1$ together form an alkylene radical, such as, especially, a trimethylene or tetramethylene radical, and wherein R$_2$ and R$_3$ separately each denote a radical of a monohydric alcohol obtained by removing the hydroxyl group, or together denote the radical of a dialcohol obtained by removing both hydroxyl groups.

Preferably, in Formula I the radical R represents a hydrogen atom, a lower alkyl radical with 1 to 4 carbon atoms or a γ-aminopropyl group, and R$_1$ represents a hydrogen atom or a lower alkyl radical with 1 to 4 carbon atoms.

The aminoacetals and aminoketals of the Formula I are manufactured according to the invention by catalytically hydrogenating cyanoethylated aldehydes or ketals of the general formula

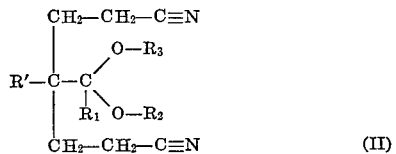

(II)

wherein R$_1$, R$_2$ and R$_3$ have the same meaning as in the Formula I, and R' denotes a hydrogen atom, an aliphatic hydrocarbon radical preferably containing 1 to 7 carbon atoms, a cycloaliphatic, araliphatic or aromatic hydrocarbon radical or a β-cyanoethyl group,

—CH$_2$—CH$_2$—CN

The cyanoethylated acetals or ketals of the Formula II are obtained in a manner which is in itself known, by acetalising or ketalising cyanoethylated aldehydes or ketones of the formula

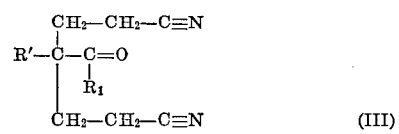

(III)

in a manner which is in itself known, such as, for example, by heating the aldehydes or ketones of the Formula III together with a suitable monoalcohol or dialcohol and in the presence of an inert organic solvent which serves as an azeotrope, such as benzene, whilst azeotropically distilling off the water of reaction formed.

Higher-boiling monoalcohols and dialcohols, such as n-butanol, isobutanol, ethylene glycol and propane-1,2-diol are above all suitable for the acetalisation or ketalisation.

The cyanoethylated ketones of the Formula III can as a rule be manufactured in good yields by direct addition of acrylonitrile to ketones, such as acetone, methyl ethyl ketone, methyl butyl ketone, cyclohexanone and cyclopentanone.

To manufacture the cyanoethylated aldehydes of the Formula III, on the other hand, it is as a rule necessary to follow the roundabout approach via the Schiff's bases, since interfering side-reactions (for example aldolcondensations) occur during the known alkaline addition of acrylonitrile to the unprotected aldehydes. On the other hand, the Schiff's bases obtained by reaction of aldehydes such as acetaldehyde, propionaldehyde, butyraldehyde, isobutyraldehyde and valeraldehyde, with primary monoamines of the aliphatic, cycloaliphatic, araliphatic or aromatic series, such as, for example, methylamine, ethylamine, propylamine, butylamine, cyclohexylamino or aniline, which contain a protected aldehyde group, can be cyanoethylated in good yields.

Bis-cyanoethyl and tris-cyanoethyl derivatives are thereby obtained, in which the cyanoethyl groups are located on the same carbon atom, which is in the α-position to the —C=N— grouping. The cyanoethylated Schiff's base obtained is then saponified in a known manner, for example with hydrochloric acid, to give the cyanoethylated aldehyde of the Formula III.

The cyanoethylated acetals and ketals of the Formula II are catalytically hydrogenated according to the methods customary in the laboratory and in industry, at temperatures of up to 200° C., preferably between 90° and 130° C., either without the use of pressure, for example in a duck-shaped shaking vessel, or under pressure in an autoclave.

Known hydrogenation catalysts are, for example, above all those based on very finely divided metals of Group VIII of the Periodic System. The following may be mentioned: catalysts based on platinum or palladium, such as platinum black and palladium black, platinum oxide or platinum hydroxide, palladium oxide or palladium hydroxide, optionally precipitated on carrier materials, such as asbestos, pumice, kieselguhr, silica, aluminium oxide, active charcoal or sulphates, carbonates or oxides of magnesium, calcium, barium, zinc, aluminium, iron, chromium and zirconium.

Preferably, very finely divided nickel or cobalt (Raney nickel or Raney cobalt) or Raney nickel with a low palladium content are used.

As solvents for the hydrogenation, it is possible to use the organic solvents usually employed together with the above-mentioned types of catalysts, especially alcohols or ethers, such as methanol, ethanol and dioxane.

As mentioned initially, the new aminoacetals and aminoketals of the Formula I represent valuable curing agents for epoxide resins.

A further subject of the present invention are thus curable mixtures which are suitable for the manufacture of mouldings, impregnations, coatings and adhesive bonds, and which are characterised in that they contain (a) a polyepoxide compound with an average of more than one epoxide group in the molecule; and (b) as the curing agent, an acetal or ketal of the Formula I which is substituted in the α-position by at least two γ-aminopropyl groups. Appropriately, 0.5 to 1.3 equivalents, preferably approx. 1.0 equivalent, of nitrogen-bonded active hydrogen atoms of the aminoacetal or aminoketal of the Formula I are used per 1 equivalent of epoxide groups of the polyepoxide compound (a).

Possible polyepoxide compounds (a) are above all those with an average of more than one glycidyl group, β-methylglycidyl group or 2,3-epoxycyclopentyl group bonded to a hetero-atom (for example sulphur, and preferably oxygen or nitrogen); in particular, there may be mentioned bis-(2,3-epoxycyclo-pentyl)ether; diglycidyl ethers and polyglycidyl ethers of polyhydric aliphatic alcohols, such as 1,4-butanediol, or of polyalkylene glycols, such as polypropylene glycols; diglycidyl ethers or polyglycidyl ethers of cycloaliphatic polyols, such as 2,2-bis-(4-hydroxycyclohexyl)-propane; diglycidyl ethers or polyglycidyl ethers of polyhydric phenols, such as resorcinol, bis-(p-hydroxyphenyl)methane, 2,2-bis(p-hydroxyphenyl)-propane (=diomethane), 2,2-bis(4'-hydroxy-3',5'-dibromo-phenyl)propane, 1,1,2,2 - tetrakis - (p - hydroxyphenyl)ethane or of condensation products of phenols with formaldehyde obtained under acid conditions, such as phenol Novolacs and cresol Novolacs; di- or poly-(β-methylglycidyl)ethers of the abovementioned polyhydric alcohols or polyhydric phenols; polyglycidyl esters of polybasic carboxylic acids, such as phthalic acid, terephthalic acid, Δ⁴-tetrahydrophthalic acid and hexahydrophthalic acid; N-glycidyl derivatives of amines, amides and heterocyclic nitrogen bases, such as N,N-diglycidyl-aniline, N,N-diglycidyl-toluidine and N,N,N',N'-tetraglycidyl-bis(p-aminophenyl) - methane; triglycidyl - isocyanurate; N,N'-diglycidyl-ethyleneurea; N,N'-diglycidyl-5,5-dimethyl-hydantoin, N,N'-diglycidyl-5-isopropyl-hydantoin; N,N'-diglycidyl-5,5-dimethyl-6 - isopropyl - 5,6 - dihydrouracil.

If desired, active diluents, such as, for example, styrene oxide, butyl glycidyl ether, isooctyl glycidyl ether, phenyl glycidyl ether, cresyl glycidyl ether, and glycidyl esters of synthetic, highly branched, mainly tertiary aliphatic monocarboxylic acids ("Cardura E") can be added to the polyepoxides to lower the viscosity.

The curing of the curable mixtures according to the invention to give mouldings and the like is appropriately carried out in the temperature range of 20 to 150° C. The curing can also be carried out in two or more stages in a known manner, with the first curing stage being carried out at a lower temperature and the post-curing at a higher temperature.

The curing can, if desired, also be carried out in 2 stages in such a way that the curing reaction is first prematurely stopped or the first stage is carried out at room temperature or only slightly elevated temperature, whereby a curable precondensate (so-called "B-stage") which is still fusible and soluble is obtained from the epoxide component (a) and the amine curing agent (b). Such a precondensate can for example serve for the manufacture of "prepregs," compression moulding compositions, or especially, sintering powders.

In order to shorten the gelling times or curing times, known accelerators for the amine curing reaction, for example monophenols or polyphenols, such as phenol or diomethane, salicylic acid, tertiary amines or salts of thiocyanic acid, such as NH₄SCN, can be added.

The term "curing," as used here, denotes the conversion of the soluble, either liquid or fusible, polyepoxides into solid, insoluble and infusible, three-dimensionally cross-linked products or materials, and, in particular, as a rule with simultaneous shaping to give mouldings, such as castings, pressings, laminates and the like, or "sheet-like structures," such as coatings, lacquer films or adhesive bonds.

The curable mixtures according to the invention of polyepoxide compounds (a) and aminoacetals or aminoketals of the Formula I as curing agents can furthermore be mixed, in any stage before curing, with customary modifiers, such as extenders, fillers and reinforcing agents, pigments, dyestuffs, organic solvents, plasticisers, flow control agents, agents for conferring thixotrophy, flame-proofing substances, or mould release agents.

As extenders, reinforcing agents, fillers and pigments which can be employed in the curable mixtures according to the invention there may, for example, be mentioned: coal tar, bitumen, textile fibres, glass fibres, asbestos fibres, boron fibres, carbon fibres, cellulose, polyethylene powder and polypropylene powder; quartz powder; mineral silicates, such as mica, asbestos powder and slate powder; kaolin, aluminium oxide trihydrate, chalk powder, gypsum, antimony trioxide, bentones, silica aerogel ("Aerosil"), lithopone, barytes, titanium dioxide, carbon black, graphite, oxide pigments, such as iron oxide, or metal powders such as aluminum powder or iron powder.

Suitable organic solvents for modifying the curable mixtures are, for example, toluene, xylene, n-propanol, butyl acetate, acetone, methyl ethyl ketone, diacetone-alcohol, ethyleneglycol monomethyl ether, monoethyl ether and monobutyl ether.

Dibutyl phthalate, dioctyl, phthalate, and dinonyl phthalate, tricresyl phosphate, trixylenyl phosphate and also polypropylene glycols can, for example, be employed as plasticisers for modifying the curable mixtures.

Silicones, cellulose acetobutyrate, polyvinyl butyral, waxes, stearates and the like (which in part can also be used as mould release agents) can be added as flow control agents when employing the curable mixtures especially in surface protection.

Particularly for use in the lacquer field, the polyepoxide compounds can moreover be partially esterified in a known manner with carboxylic acids, such as, especially, higher unsaturated fatty acids. It is furthermore possible to add other curable synthetic resins, for example phenoplasts or aminoplasts, to such lacquer resin formulations.

The curable mixtures according to the invention can be manufactured in the usual manner with the aid of known mixing equipment (stirrers, kneaders, rolls and the like).

The curable epoxide resin mixtures according to the invention are above all employed in the fields of surface protection, the electrical industry, laminating processes and the building industry. They can be used, in a formulation suited in each case to the particular end use, in the unfilled or filled state, optionally in the form of solutions or emulsions, as paints, lacquers, sintering powders, compression moulding compositions, injection moulding formulations, dipping resins, casting resins, impregnating resins, binders and adhesives, tool resins, laminating resins, sealing and filling compositions, floor covering compositions and binders for mineral aggregates.

In the examples which follow, unless otherwise stated, parts denote parts by weight and percentages denote percentages by weight. The relationship of parts by volume to parts by weight is as of the millilitre to the gram.

The following epoxide resins were used for the manufacture of curable mixtures described in the examples:

Epoxide resin A

Polyglycidyl ether resin (technical product) manufactured by condensation of diomethane (2,2-bis(p-hydroxy-phenyl)-propane) with a stoichiometric excess of epichlorohydrin in the presence of alkali, which consists mainly of diomethane-diglycidyl ether of the formula

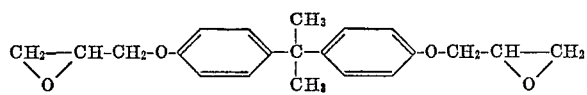

and is liquid at room temperature and has the following characteristics: epoxide content: 5.1–5.5 epoxide equivalents/kg.; viscosity (Hoeppler) at 25° C.: 9.000–13.000 cp.

Epoxide resin B

Diglycidyl ether resin (technical product) manufactured by condensation of hydrogenated diomethane (2,2-bis-(p-hydroxy-cyclohexyl)-propane) with a stoichiometric excess of epichlorohydrin in the presence of alkali, which consists mainly of hydrogenated diomethane-diglycidyl ether of the formula

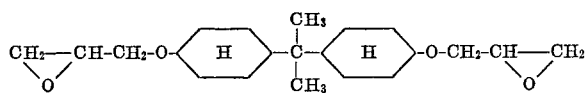

and is liquid at room temperature and has an epoxide content of 4.46 epoxide equivalents/kg.

Epoxide resin C

Tetrahydrophthalic acid diglycidyl ester having the following characteristics: epoxide content: 6.45 equivalents/kg.; viscosity (Hoeppler) at 25° C.: 450–550 cp.

To determine the mechanical and electrical properties of the curable mixtures described in the examples which follow, sheets of size 135 x 135 x 4 mm. were manufactured for the determination of the flexural strength, deflection, impact strength and water absorption, and the test specimens corresponding to the standard specifications were machined from these sheets.

MANUFACTURING EXAMPLES—EXAMPLE 1

2,2-bis-(γ-aminopropyl)-propionaldehyde-ethylene glycol-acetal (a) γ-Formyl-γ-methyl-pimelonitrile (F. Weiss, R. Rusch and A. Lautz, Bull. Soc. Chim. France 1965 (2), 490–3 [compare CA 61, 2960, g., 63, 11, 354]).

103 g. of N-isopropyl-2,2-bis-(β-cyanoethyl)propionaldimine in 100 ml. of ethanol and 200 ml. of $H_2O$ are treated with concentrated HCl (approx. 42 ml.), whilst stirring and cooling with ice, until the mixture reacts acid. The aldehyde thus produced is extracted with chloroform, the solution is dried with $Na_2SO_4$, and then stripped on a rotary evaporator. Fractional distillation of the residue through a 40 cm. packed column gives 55.7 g. (67.6% of the theoretical yield) of pure bis-cyanoethylated propionaldehyde of boiling point 157°/2×10$^{-3}$ mm. Hg.

(b) Glycol-acetal of γ-formyl-γ-methyl-pimelonitrile.

The aldehyde is manufactured from 152 g. of N-isopropyl-2,2-bis-(β-cyanoethyl)-propionaldimine as before, and after stripping off the chloroform, the crude product is converted into the acetal by boiling with 55 g. of ethylene glycol in 250 ml. of benzene, using a water separator. After 12 hours, no further $H_2O$ separates off. The residue is concentrated on a rotary evaporator and fractionated through a 40 cm. packed column, whereby 124 g. (80.3% of the theoretical yield) of boiling point 138–143°/ 2×10$^{-4}$ mm. Hg are obtained.

A middle fraction was taken for analysis. Calc'd for $C_{11}H_{16}N_2O_2$ (M=208.26) (percent): C, 63.44; H, 7.74; N, 13.45. Found (percent): C, 63.27; H, 7.73; N, 13.65. NMR-spectrum recorded in $DCCl_3$:

| | |
|---|---|
| CH₂—CH₂—CN structure with d, CH₃—C—CH, O—CH₂, O—CH₂, CH₂—CH₂—CN (b, c), e | 1 H$_a$ singlet ........ 4.50δ<br>4 H$_e$ multiplet ...... 4.1-3.8δ<br>4 H$_c$ multiplet ...... 2.6-2.2δ<br>4 H$_b$ multiplet ...... 2.0-1.6δ<br>3 H$_d$ singlet ......... 0.95δ |

(c) 2,2 - bis-(γ-aminopropyl)-propionaldehyde-glycol-acetal.

80 g. of distilled 2,2-bis-(β-cyanoethyl)-propionaldehyde-glycol-acetal in 500 ml. of methanol saturated with ammonia are hydrogenated with 14.5 g. of Raney nickel, containing 2% of palladium, in an autoclave at 90–100° C. and 100 atmospheres gauge pressure of $H_2$. The reduction is practically complete after 30 minutes. The mixture is allowed to cool and a further 80 g. of substance are added. The reduction can be rapidly completed at 90–100° C. The catalyst is filtered off, and the filtrate is concentrated on a rotary evaporator and fractionated through a 40 cm. packed column.

Yield: 103.8 g. (62.5% of the theoretical yield), boiling point 168–169° C./7 mm. Hg.

Analysis.—Calc'd for $C_{11}H_{24}N_2O_2$ (M=216.33) (percent): C, 61.08; H, 11.18; N, 12.95. Found (percent): C, 60.90; H, 11.20; N, 13.01.

NMR-spectrum in $CCl_4$:

| | |
|---|---|
| CH₂—CH₂—CH₂—NH₂ structure with d, CH₃—C—CH, O—CH₂, O—CH₂, CH₂—CH₂—CH₂—NH₂ (b, c), e | 1 H$_a$ singlet ..... 4.42δ<br>4 H$_e$ multiplet .. 3.7δ<br>4 H$_b$ multiplet .. 2.45δ<br>3 H$_d$ and 4 H$_c$... 0.72+0.68δ |

IR-spectrum:

| Band [cm.$^{-1}$] | Interpretation |
|---|---|
| 3370, medium intensity | NH$_2$ stretching vibration. |
| 3280, medium intensity | Do. |
| 3200, shoulder | Harmonic vibration 1,600 cm.$^{-1}$. |
| 1595, intense | NH$_2$ deformation vibration. |

EXAMPLE 2

2,2-bis-(γ-aminopropyl)-acetaldehyde-ethylene glycol-acetal (a) 2,2-bis-(β - cyanoethyl)-acetaldehyde-glycol acetal.

130 g. of N-n-butyl-2,2-bis(β-cyanoethyl)-acetaldimine in 100 ml. of ethanol and 200 ml. of water are treated with concentrated HCl, whilst stirring, until an acid reaction is obtained (approx. 60 ml.) and the mixture is additionally briefly heated to the boil. After cooling, it is slightly concentrated on a rotary evaporator, and the aldehyde is extracted with chloroform. The extract is dried over $Na_2SO_4$, the solvent is removed on a rotary evaporator, and after addition of 150 ml. of benzene and 43 g. of ethylene glycol the mixture is azeotropically freed of water overnight, using a water separator. The acetal is purified by fractional distillation.

Yield: 59.3 g. (48% of the theoretical yield) of boiling point 145–158° C./10$^{-3}$ mm. Hg. The bulk of the material boils at 158° C./10$^{-3}$ mm. Hg.

NMR-spectrum recorded in $DCCl_3$:

| | |
|---|---|
| CH₂—CH₂—CN structure with b H—C—CH, O—CH₂, O—CH₂, CH₂—CH₂—CN (c, d), e | 1 H$_a$ doublet ........... 4.80δ<br>4 H$_e$ multiplet .......... 3.90δ<br>4 H$_d$ triplet ............. 2.50δ<br>4 H$_c$ + 1H$_b$ multiplet ... 1.5-2.1δ |

(b) 2,2-bis-(γ-aminopropyl)acetaldehyde-glycol-acetal.

46.5 g. of 2,2-bis-(β-cyanoethyl)acetaldehyde-glycol-acetal in 500 ml. of methanol saturated with ammonia are hydrogenated in an autoclave with 10 g. of Raney nickel catalyst (RCH 55/5 of Messrs. Ruhrchemie AG, Oberhausen-Holten) at 130° C. and 30 atmospheres gauge, over the course of 5 hours. The catalyst is filtered off, and the solvent is removed on a rotary evaporator. Hereupon, fairly pure 2,2-bis-(γ-aminopropyl)-acetaldehyde-glycol-acetal is left.

For analysis, a small amount was fractionated through a rotating strip column. The pure amine boils at 169–170° C./9 mm. Hg.

*Analysis.*—Calc'd for $C_{10}H_{22}N_2O_2$ (M=202.30) (percent): C, 59.37; H, 10.96; N, 13.85. Found (percent): C, 59.65; H, 10.94; N, 13.09.

NMR-spectrum recorded in $CCl_4$:

| Structure | | |
|---|---|---|
| $CH_2-CH_2-CH_2-NH_2$ \ O-CH_2 / d H-C-CH e \a / O-CH_2 \ $CH_2-CH_2-CH_2-NH_2$ b c | 1 $H_a$ broad, ill-defined | 4.67δ |
| | 4 $H_e$ multiplet | 3.84δ |
| | 4 $H_b$ multiplet | 2.9–2.3δ |
| | 4 $H_c$ singlet | 0.78δ |

EXAMPLE 3

2,2,2-tris-(N-aminopropyl)-acetaldehyde-ethylene glycol-acetal (a) 2,2,2-tris-(β-cyanoethyl)-N-cyclohexylacetaldimine described in "Krimm, German patent specification 951,568."

88 g. of acetaldehyde are added dropwise to 198 g. of cyclohexylamine in 120 ml. of toluene whilst stirring and cooling to 20° C., and the water of reaction is thereafter separated off by adding 15 g. of anhydrous potassium carbonate. The organic phase is heated for 3 hours to 160° C. with 370 g. of acrylonitrile in an autoclave, and after cooling the product is recrystallised from 250 ml. of toluene.

Yield: 322.6 g. of crude product (56.8% of the theoretical yield); melting point 99–103° C. (literature: yield 40%; melting point 109–110° C.). Further quantities can be isolated from the filtrate, so that the yield of crude material rises to 374 g. (65.8%).

(b) Tris-cyanoethyl-acetaldehyde.

44.2 g. of pure product from the preliminary stage are boiled in 600 ml. of $H_2O$ and 20 ml. of concentrated HCl for 30 minutes under reflux. On cooling, 30.6 g. of tris-cyanoethylated acetaldehyde crystallise out (97% of the theoretical yield); melting point: 114° C., NMR-spectrum recorded in trifluoroacetic acid:

| $O=CH-C(CH_2CH_2CN)_3$ a b c | 1 $H_a$ singlet | 9.76δ |
|---|---|---|
| | 6 $H_c$ multiplet | 3.0–2.4δ |
| | 6 $H_b$ multiplet | 2.4–1.8δ |

IR-spectrum:

| Band \| cm.$^{-1}$ | Interpretation |
|---|---|
| 2820+2720 | Aldehyde bands. |
| 2245 | $C\equiv N$ stretching vibration. |
| 1720 | $C=O$ stretching vibration. |

(c) Ethylene glycol-acetal of 2,2,2-tris-cyanoethyl-acetaldehyde.

50 g. of the aldehyde in 400 ml. of chloroform are boiled with 18 g. of ethylene glycol and 1 ml. of concentrated sulphuric acid, using a water separator (Soxhlet extractor, filled with lumps of $CaCl_2$). After 6 hours, the starting product has dissolved completely, and the reaction has ended. On cooling, 43.8 g. of substance of melting point 111–112° C. crystallise out. The filtrate is concentrated to dryness and the residue is recrystallised from 200 ml. of ethanol.

Yield: 13.9 g. of melting point 111–112° C.

Further concentration yields 1.0 g. of melting point 111–112° C. Hence the total yield is 58.7 g. (96.5% of the theoretical yield). Recrystallisation of 2.0 g. from 40 ml. of ethanol gave 1.87 g. of pure product of melting point 114–115° C.

NMR-spectrum recorded in trifluoroacetic acid:

| Structure | | |
|---|---|---|
| $CH_2-O$ \ a CH-C(CH_2-CH_2-CN)_3 / $CH_2-O$ b c d | 1 $H_b$ singlet | 4.80δ |
| | 4 $H_a$ singlet | 4.10δ |
| | 6 $H_b$ triplet | 2.77δ |
| | 6 $H_c$ triplet | 2.00δ |

(d) Ethylene glycol-acetal of 2,2,2-tris-(γ-aminopropyl)-acetaldehyde.

110 g. of the nitrile in 500 ml. of methanol saturated with $NH_3$ are hydrogenated, in the presence of 15 g. of Raney nickel catalyst, at 110–120° C. in an autoclave at 110 atmospheres gauge over the course of 6 hours. After filtering off the catalyst, the solvent is stripped off on a rotary evaporator, whereupon an oil remains. 268 g. of the nitrile were in this way hydrogenated in 3 batches and the crude products are distilled together in a high vacuum, without a column.

Yield: 165 g. of product of boiling point 170–172° C./10$^{-3}$ mm. Hg (59% of theory).

NMR-spectrum recorded in $CCl_4$:

| Structure | | |
|---|---|---|
| $CH_2-O$ \ a CH-C-(CH_2-CH_2-CH_2-NH_2)_3 / $CH_2-O$ b c d e f | 1 $H_b$ singlet | 4.53δ |
| | 1 $H_a$ multiplet | 3.7–3.9δ |
| | 6 $H_e$ multiplet | 2.7–2.4δ |
| | 6 $H_d$+6 $H_c$ multiplet approximate | 1.3δ |
| | 6 $H_f$ singlet | 0.85δ |

EXAMPLE 4

1,1,1-tris-(γ-aminopropyl)-acetone-ethylene glycol-ketal (a) 1,1,1-tris-cyanoethylacetone.—Described in: Krimm, German patent specification 1,002,342; Bruson, Riener, J. Am. Chem. Soc. 64, 2850 (1942).

300 g. of acetone are dissolved in 200 g. of tert.-butanol, 15 g. of 30% strength methanolic KOH are added, and 530 g. of acrylonitrile, dissolved in 220 g. of tert.-butanol, are added dropwise over the course of 7 hours at $-5°$ C. to $+5°$ C. After 12 hours' standing at room temperature, the organic solvent is filtered off and the moist crude product is boiled up with 500 ml. of methyl ethyl ketone whilst stirring. The mixture is allowed to cool whilst stirring and the product is filtered off and dried at 70° C.

Yield: 551 g. (76.3% of theory); melting point: 154° C.

(b) Ethylene glycol-ketal of 1,1,1-tris-cyanoethyl-acetone.

106 g. of the ketone in 400 ml. of chloroform are boiled for 6 days with 30 g. of ethylene glycol and 2 ml. of concentrated sulphuric acid, using a water separator (Soxhlet+$CaCl_2$). After this, almost all the material has dissolved. The mixture is filtered and cooled, whereupon a crude mixture of unreacted starting product and ketalised product crystallises out.

Yield: 86.6 g. of melting point 130–150° C.

The filtrate yields a further 19.5 g. of melting point 130–142° C.

A sample for analysis, of melting point 153–154° C., was obtainable by repeated recrystallisation from ethanol (the starting product happens to have the same melting point, but gives a depression if the mixed melting point with the ketal is determined).

$$\begin{array}{c} \text{CH}_2\text{—O} \quad\quad \text{CH}_3 \text{ b} \\ a \mid\quad\quad\quad\; \diagdown\;\; \diagup \\ \quad\quad\quad\quad\quad \text{C} \\ \quad\quad\quad\; \diagup\;\; \diagdown \\ \text{CH}_2\text{—O} \quad\quad \text{C—(CH}_2\text{CH}_2\text{CH}_2\text{NH}_2)_2 \\ \quad\quad\quad\quad\quad \text{CH}_3\;\; d\;\; e\;\; f\;\; g \\ \quad\quad\quad\quad\quad\quad c \end{array}$$

| | |
|---|---|
| 4 $H_a$ singlet | 3.85δ |
| 4 $H_f$ multiplet | 2.7–2.4δ |
| 4 $H_e$ +4 $H_d$ | 1.6–1.3δ |
| 3 $H_b$ singlet | 1.17δ |
| 3 $H_o$+4 $H_g$ | 1.03δ |

*Analysis.*—Calc'd for $C_{14}H_{19}N_3O_2$ (M=261.33) (percent): C, 64.35; H, 7.33; N, 16.08. Found (percent): C, 64.35; H, 7.16; N, 15.98.

NMR-spectrum recorded in deuterated dimethylsulphoxide:

$$\begin{array}{c} \quad\quad a\quad\;\; c\quad\;\; d \\ \text{CH}_3\text{—C—C(CH}_2\text{CH}_2\text{CN)}_3 \\ \quad\;\; \diagup\;\;\;\diagdown \\ \quad\;\;\text{O}\quad\;\;\;\;\text{O} \\ \quad\;\;\mid\quad\;\;\;\;\mid \\ \quad\;\;\text{CH}_2\text{—CH}_2 \\ \quad\quad\quad b \end{array}$$

| | |
|---|---|
| 4 $H_b$ singlet | 3.87δ |
| 6 $H_d$ multiplet | 2.7–2.3δ |
| 6 $H_c$ multiplet | 1.9–1.5δ |
| 3 $H_a$ singlet | 1.18δ |

(c) 91 g. of the crude product, obtained in Example 4(b), consisting of ketalised tri-cyanoethylated acetone and unreacted starting product, in 500 ml. of ethanol, are hydrogenated with 10 g. of Raney nickel catalyst in an autoclave at 100 atmospheres gauge and 140–150° C. The catalyst is filtered off, the filtrate is concentrated and the residue is distilled in a high vacuum without a column. 36 g. of an oil which largely boils at 185° C. and 0.04 mm. Hg and mainly consists of 1,1,1-tris-(γ-aminopropyl)-acetone-ethylene glycol-ketal are thereby obtained.

EXAMPLE 5

3,3-bis-(γ-aminopropyl)-butanone-(2)-ethylene glycol-ketal (a) Ethylene glycol ketal of 4-acetyl-4-methyl-pimelonitrile.

179 g. of bis-cyanoethylated methyl ethyl ketone in 500 ml. of chloroform are boiled with 70 g. of ethylene glycol (10% excess) and 3 ml. of concentrated $H_2SO_4$ for three days, using a water separator. The water separator consists of a Soxhlet extractor which is filled with lumps of $CaCl_2$. A little undissolved, oily product is filtered off, and the filtrate is concentrated on a rotary evaporator. The oily residue is distilled in a high vacuum through a column. Hereupon 190.2 g. of substance (85.0% of theory) pass over at 152 to 164° C./5×10⁻⁴ mm. Hg. The first and last fractions barely differ in the NMR-spectrum. A middle fraction was analysed.

*Analysis.*—Calc'd for $C_{12}H_{18}N_2O_2$ (M=222.29) (percent): C, 64.84; H, 9.16; N, 12.60. Found (percent): C, 65.11; H, 8.26; N, 12.75.

NMR-spectrum recorded in $CDCl_3$:

$$\begin{array}{c} d\quad\;\; \text{CH}_3\quad\;\; e \\ \text{CH}_3\text{—C—C(CH}_2\text{CH}_2\text{CN)}_3 \\ \quad\;\; \diagup\;\;\;\diagdown\;\; c\quad d \\ \quad\;\;\text{O}\quad\;\;\;\;\text{O} \\ \quad\;\;\mid\quad\;\;\;\;\mid \\ \quad\;\;\text{CH}_2\text{—CH}_2 \\ \quad\quad\quad b \end{array}$$

| | |
|---|---|
| 4 $H_b$ singlet | 3.95δ |
| 4 $H_d$ multiplet | 2.7–2.1δ |
| 4 $H_c$ multiplet | 2.1–1.6δ |
| 3 $H_a$ singlet | 1.27δ |
| 3 $H_e$ singlet | 0.98δ |

(b) 3,3 - bis(γ-aminopropyl)-butanone-2-ethylene glycol-ketal.

187 g. of the nitrile manufactured under 5(a) in 500 ml. of methanol saturated with $NH_3$ are hydrogenated with 10 g. of Raney nickel catalyst (RCH 55/5 of Ruhrchemie AG, Oberhausen-Holten) in an autoclave at between 90 and 110° C. at 100 atmospheres gauge pressure of $H_2$. After removing the catalyst and the solvent, the residue is fractionated through a 40 cm. packed column. Yield: 105 g. (54% of theory) of boiling point 169–172° C./6 mm. Hg.

A middle fraction was analysed.

*Analysis.*—Calc'd for $C_{12}H_{26}N_2O_2$ (M=230.35) (percent): C, 62.58; H, 11.38; N, 12.17. Found (percent): C, 63.65; H, 11.39; N, 12.08.

NMR-spectrum recorded in $CCl_4$:

USE EXAMPLES—EXAMPLE I 63 parts of epoxide resin A were homogeneously mixed at room temperature with 18 parts of 2,2-bis-(γ-aminopropyl)-propionaldehyde - ethylene glycol-acetal (manufactured according to Example 1), corresponding to a ratio of epoxide equivalents/active nitrogen-bonded H atoms=1.0:1.0, and the mixture was degassed in a high vacuum and poured into aluminium moulds. The moulding composition gelled, whilst its temperature rose exothermically, and after cooling the composition was post-cured for a further 24 hours at 100° C. in a drying cabinet.

The resulting castings had the following properties:

Flexural strength (VSM 77,103)=11.5 kg./mm.²
Deflection (VSM 77,103)=10.4 mm.
Impact strength (VSM 77,105)=21 cm. kg./cm.²
Water absorption (24 hours/20° C.)=0.16%

EXAMPLES II–IV

Curable mixtures were prepared, as described in Example I, in an equivalent ratio of epoxide group to active nitrogen-bonded H atoms=1.0:1.0, ond were cured under the some processing conditions.

EXAMPLE II 68.1 parts of epoxide resin A and 20.4 parts of 3,3,-bis-(γ-aminopropyl)-butanone -(2) - ethylene glycol-ketal.

EXAMPLE III 75.5 parts of epoxide resin A and 17.3 parts of 2,2,2-tris-(γ-aminopropyl)-acetaldehyde-ethylene glycol-acetal.

EXAMPLE IV 75.5 parts of epoxide resin A and 18.2 parts of 1,1,1-tris-(γ-aminopropyl)-acetone-ethylene glycol-ketal.

The properties of the mouldings manufactured according to Examples II–IV are summarised in the table given later.

EXAMPLE V–IX

The following mixtures were prepared in the same equivalent ratio of epoxide group to active nitrogen-bonded H atoms as described in Example I, but was subsequently pre-cured for 4 hours at 80° C. and post-cured for 12 hours at 140° C.

EXAMPLE V 130.0 parts of epoxide resin B and 31.2 parts of 2,2-bis - (γ-aminopropyl)-propionaldehyde-ethylene glycol-acetal.

EXAMPLE VI 76.0 parts of epoxide resin B and 14.7 parts of 2,2,2-tris-(γ-aminopropyl)-acetaldehyde-ethylene glycol-acetal.

EXAMPLE VII 120.0 parts of epoxide resin C and 41.3 parts of 2,2-bis-(γ - aminopropyl)-propionaldehyde-ethylene glycol-acetal.

EXAMPLE VIII 58.0 parts of epoxide resin C and 21.3 parts of 3,3-bis-(γ-aminopropyl)-butanone - (2) - ethylene glycol-ketal.

EXAMPLE IX 58.5 parts of epoxide resin C and 16.0 parts of 2,2,2-tris(γ-aminopropyl)-acetaldehyde-ethylene glycol-acetal.

The properties of the mouldings manufactured according to Examples V–IX are summarised in the table below.

| Use Example | GTT, °C. | SP, °C. | FS, kg./mm.² | DF, mm. | IS, cm. kg./cm.² | TS, kg./mm.² | EB, per-cent | HDP, °C. | WA, per-cent |
|---|---|---|---|---|---|---|---|---|---|
| 2 | 117 |  | 12.3 | 10.7 | 16.1 |  |  | 88 |  |
| 3 | 137 |  | 12.4 | 6.9 | 11.7 |  |  | 115 |  |
| 4 | 127 |  | 13.2 | 6.9 | 13.8 |  |  | 106 |  |
| 5 |  | 58 | 9.9 | 16.0 | 70.2 | 5.5 | 4.7 |  |  |
| 6 |  | 70 | 9.4 | 4.4 | 12.5 | 6.4 | 4.4 |  |  |
| 7 |  | 73 | 13.9 | 13.3 | 15.3 | 8.5 | 6.9 |  |  |
| 8 |  | 74 | 14.0 | 5.5 | 15.4 |  |  |  |  |
| 9 |  | 92 | 15.4 | 9.0 | 10.2 |  |  |  |  |

¹ Measured in the Differential Scanning Calorimeter (DSC-1) at a speed of heating of 16° C./min.

NOTE:
GTT=Glass transition temperature (DSC-1¹).
SP=Softening point according to DIN 53,461.
FS=Flexural strength according to VSM 77,103.
DF=Deflection according to VSM 77,103.
IS=Impact strength according to VSM 77,105.
TS=Tensile strength according to VSM 77,101.
EB=Elongation at break according to VSM 77,101.
HDP=Heat distortion point according to ISO R 75.
WA=Water absorption after 1 day at 20° C.

What we claim is:
1. A compound of formula

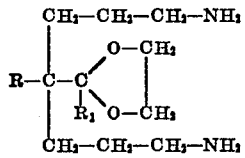

wherein R represents a member selected from the group consisting of hydrogen, alkyl with 1 to 4 carbon atoms and γ-aminopropyl, R₁ represents a member selected from the group consisting of hydrogen and methyl.

2. A compound as claimed in claim 1 which is 2,2-bis-(γ-aminopropyl)-propionaldehyde-ethylene glycol-acetal.

3. A compound as claimed in claim 1 which is 2,2-bis-(γ-aminopropyl)-acetaldehyde-ethylene glycol-acetal.

4. A compound as claimed in claim 1 which is 2,2,2-tris(γ-aminopropyl)-acetaldehyde-ethylene glycol-acetal.

5. A compound as claimed in claim 1 which is 1,1,1-tris-(γ-aminopropyl)-acetone-ethylene glycol-ketal.

6. A compound as claimed in claim 1 which is 3,3-bis-(γ-aminopropyl)-butanone-2-ethylene glycol-ketal.

References Cited
UNITED STATES PATENTS
3,555,045  1/1971  Griffith et al. _____ 260—340.9

ALEX MAZEL, Primary Examiner

J. H. TURNIPSEED, Assistant Examiner

U.S. Cl. X.R.

260—2 EP